US007554548B2

(12) United States Patent
Furui

(10) Patent No.: US 7,554,548 B2
(45) Date of Patent: Jun. 30, 2009

(54) GAMMA CURVE GENERATION METHOD AND DEVICE FOR THE SAME

(75) Inventor: Shiki Furui, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 375 days.

(21) Appl. No.: 11/515,199

(22) Filed: Sep. 5, 2006

(65) Prior Publication Data

US 2007/0206014 A1 Sep. 6, 2007

(30) Foreign Application Priority Data

Sep. 6, 2005 (JP) ............................ 2005-257472

(51) Int. Cl.
*G06T 11/20* (2006.01)

(52) U.S. Cl. ...................................... 345/442; 345/443

(58) Field of Classification Search ................ 345/442, 345/443
See application file for complete search history.

(56) References Cited

U.S. PATENT DOCUMENTS

| | | | | |
|---|---|---|---|---|
| 5,832,133 | A | 11/1998 | Smith | |
| 5,982,379 | A | 11/1999 | Suzuki et al. | |
| 7,146,393 | B2 * | 12/2006 | Cheng | 708/290 |
| 2005/0007369 | A1 * | 1/2005 | Cao et al. | 345/442 |

FOREIGN PATENT DOCUMENTS

| | | | |
|---|---|---|---|
| EP | 0 095 716 | A2 | 12/1983 |
| EP | 0 978 996 | A2 | 2/2000 |
| JP | A-10-224632 | | 8/1998 |
| JP | A 2003-060914 | | 2/2003 |

OTHER PUBLICATIONS

Foley, James D. Computer Graphics : Principles and Pratice. New York: Addison-Wesley Longman, Limited, 1990. 476+.*

Akima, Hiroshi. "A New Method of Interpolation and Smooth Curve Fitting Based on Local Procedure." Journal of the Association for Computing Machinery 17 (1970): 589-602.*

* cited by examiner

*Primary Examiner*—Kent Chang
*Assistant Examiner*—Scott E Sonners
(74) *Attorney, Agent, or Firm*—Oliff & Berridge, PLC

(57) ABSTRACT

The gamma curve generation method of the invention selects each set of three consecutive control points among multiple consecutive control points, forms a cubic curve passing through the selected three consecutive control points, and combines all formed cubic curves to generate a gamma curve. The selected three consecutive control points are set to a first control point, a second control point, and a third control point in a sequential order. Each cubic curve is formed to pass through the first control point, the second control point, and the third control point and have a tangent of a certain gradient at the second control point, which is internal division at an inverse ratio of a gradient of a straight line connecting the first control point with the second control point and a gradient of a straight line connecting the second control point with the third control point. This arrangement of the invention demands the less amount of computation and desirably reduces the required circuit scale.

4 Claims, 6 Drawing Sheets

GAMMA CURVE GENERATION METHOD AND DEVICE FOR THE SAME

BACKGROUND OF THE INVENTION

1. Field of the Invention

The present invention relates to a technique of generating a gamma curve, which is used for gamma correction of image signals in image display devices.

2. Description of the Related Art

Projectors, liquid crystal displays, and other image display devices use a gamma curve, which represents a relation between the input tone value and the output tone value of an image signal, for gamma correction. The gamma correction converts the tone value of an input image signal according to the gamma curve and thereby enables a displayed image to have substantially the same brightness property as that of an original image expressed by the input image signal. Some of the image display devices have an additional function of adjusting the gamma curve to display an image of the user's desired brightness property.

The gamma correction may be performed in image printing devices such as printers, as well as in the image display devices.

A known gamma curve adjustment method sets multiple control points corresponding to preset input tone values on a gamma curve and changes output tone values at the preset multiple control points to adjust a gamma curve as disclosed in Japanese Patent Laid-Open Gazette No. 2003-60914.

The conventional technique generates a gamma curve as a cubic spline curve passing through plural control points.

The conventional method of generating the gamma curve as the cubic spline curve requires specification of a cubic curve for each division between a pair of adjoining control points. For example, when there are 9 control points, the conventional method requires specification of total 8 cubic curves for 8 divisions.

The cubic curve is generally expressed by Equation (2) with four constants:

$$f(x)=a+sx+tx^2+ux^3 \tag{2}$$

The conventional method thus requires determination of total 32 constants for specifying the 8 cubic curves.

When a CPU is used to specify the 8 cubic curves with determined 32 constants, the 32 constants are to be stored individually. Namely the conventional method requires 32 registers for storage of the 32 constants.

The conventional method of generating the gamma curve as the cubic spline curve requires determination of 4×(n−1) constants when there are 'n' control points. Coefficients of the spline curve are determined by solution of (n−1) simultaneous equations when there are 'n' control points. Namely the amount of computation for the spline cubic curve is proportional to the third power of 'n'. A large number of control points demand an extremely large amount of computation and undesirably extend the total processing time. The required number of registers is also 4×(n−1) for storage of the determined 4×(n−1) constants. This undesirably expands the required circuit scale.

SUMMARY OF THE INVENTION

The object of the invention is thus to eliminate the drawbacks of the prior art technique and to provide a gamma curve generation method that demands a less amount of computation and requires a relatively small circuit scale.

In order to attain at least part of the above and the other related objects, the present invention is directed to a first gamma curve generation method of generating a curve passing through multiple consecutive control points as a gamma curve used for gamma correction of an image signal. The first gamma curve generation method includes the steps of: (a) selecting each set of three consecutive control points among the multiple consecutive control points; (b) forming a cubic curve passing through the selected three consecutive control points; and (c) combining all cubic curves formed in the step (b) to generate the gamma curve.

The step (b) sets the selected three consecutive control points to a first control point, a second control point, and a third control point in a sequential order and specifies the cubic curve that passes through the first control point, the second control point, and the third control point and has a tangent of a gradient G at the second control point, which satisfies Equation (1) given below:

$$G=\frac{|G12|\times G23+|G23|\times G12}{|G12|+|G23|} \tag{1}$$

where G12 denotes a gradient of a straight line connecting the first control point with the second control point and G23 denotes a gradient of a straight line connecting the second control point with the third control point.

The first gamma curve generation method of the invention forms one cubic curve by connecting one set of three consecutive control points. When there are (2n+1) control points used for generation of a gamma curve, the required number of cubic curves is a total 'n'. Since each cubic curve has four constants to be determined, 'n' cubic curves are specified by determining total '4n' constants. Namely the amount of computation is proportional to the variable 'n'. The required number of registers is also '4n' for storage of '4n' constants, which are used to specify the 'n' cubic curves.

The first gamma curve generation method of the invention requires determination of only the '4n' constants for generation of a gamma curve. This demands the less amount of computation and thus desirably shortens the processing time. The required number of registers is only '4n' for storage of the '4n' constants. This desirably reduces the required circuit scale.

The invention is also directed to a second gamma curve generation method of generating a curve passing through multiple consecutive control points as a gamma curve used for gamma correction of an image signal. The second gamma curve generation method includes the steps of: (a) selecting each set of three consecutive control points among the multiple consecutive control points; (b) forming a cubic curve passing through the selected three consecutive control points; and (c) combining all cubic curves formed in the step (b) to generate the gamma curve.

The step (b) sets the selected three consecutive control points to a first control point, a second control point, and a third control point in a sequential order and specifies the cubic curve of passing through the first control point, the second control point, and the third control point to minimize a sum of an area defined by a straight line and an arc of the cubic curve between the first control point and the second control point and an area defined by a straight line and an arc of the cubic curve between the second control point and the third control point.

The second gamma curve generation method of the invention forms one cubic curve by connecting one set of three consecutive control points and thus exerts the similar effects to those of the first gamma curve generation method of the invention.

The second gamma curve generation method of the invention forms each cubic curve from selected three consecutive control points, which are set to the first control point, the second control point, and the third control point in the sequential order. The cubic curve is formed to minimize the sum of the area defined by the straight line and the arc of the cubic curve between the first control point and the second control point and the area defined by the straight line and the arc of the cubic curve between the second control point and the third control point. The formed cubic curve is appropriate to a polygonal line passing through the three control points.

The technique of the invention is not restricted to the gamma curve generation methods described above but may be actualized by corresponding gamma curve generation devices. Other possible applications include computer programs executed to actualize such gamma curve generation methods or gamma curve generation devices, as well as recording media with such computer programs recorded therein and data signals that include such computer programs and are embodied in carrier waves.

DESCRIPTION OF THE PREFERRED EMBODIMENTS

Some modes of carrying out the invention are discussed below in the following sequence as preferred embodiments with reference to the accompanied drawings:

A. Structure of Projector

B. Operations of Projector

C. Gamma Curve Generation Process in First Embodiment

D. Effects of First Embodiment

E. Gamma Curve Generation Process in Second Embodiment

F. Effects of Second Embodiment

G. Modifications

A. Structure of Projector

Figure 1:
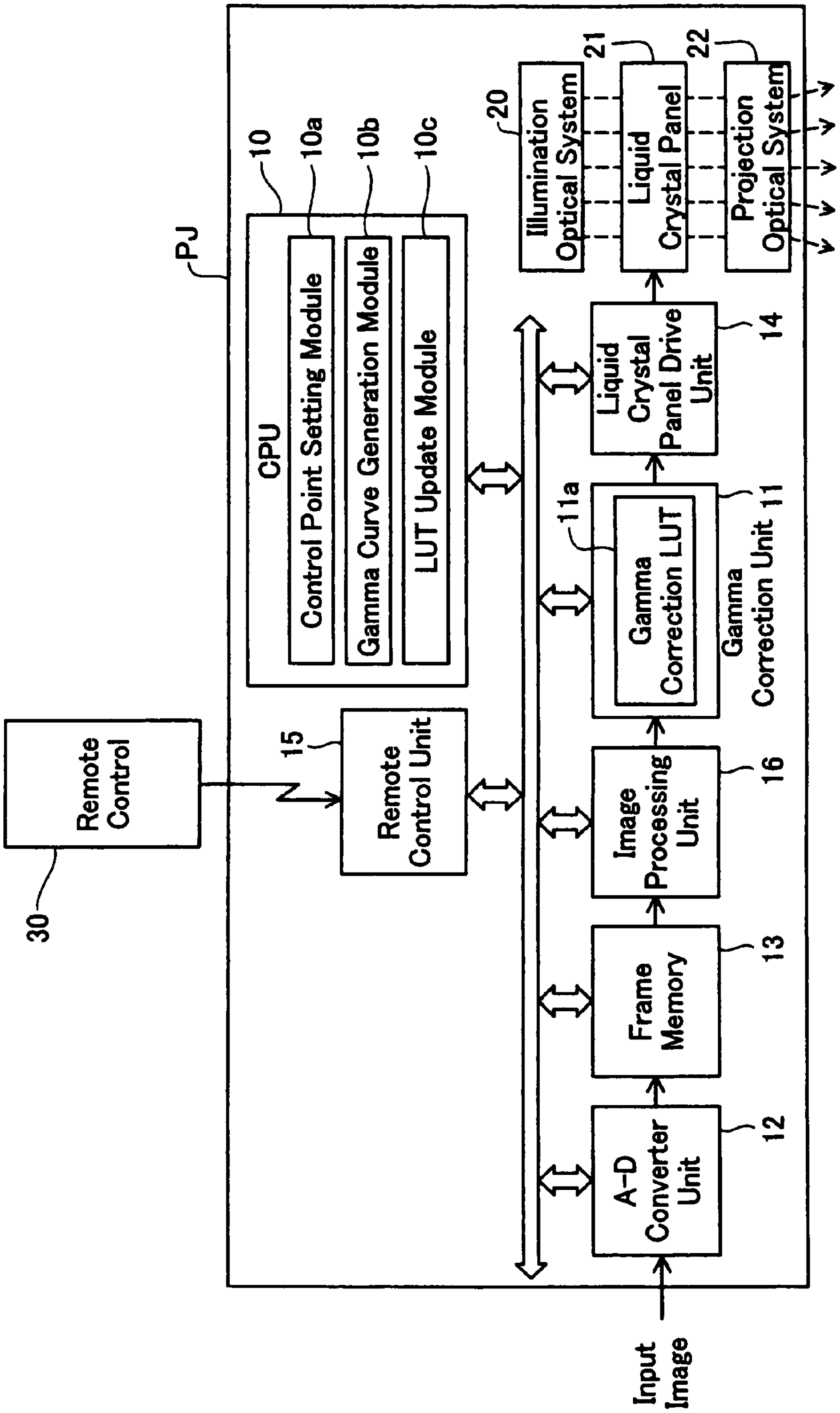
FIG. 1 is a block diagram schematically illustrating the structure of a projector as one application of the gamma curve generation method of the invention.

FIG. 1 is a block diagram schematically illustrating the structure of a projector PJ as one application of the gamma curve generation method of the invention. The projector PJ includes a CPU 10, a gamma correction unit 11, an A-D converter unit 12, a frame memory 13, a liquid crystal panel drive unit 14, a remote control unit 15, and an image processing unit 16, which are interconnected via an internal bus. The projector PJ also includes an illumination optical system 20, a liquid crystal panel 21, and a projection optical system 22 as elements of optics, and has an external remote control 30.

The CPU 10 executes programs stored in a memory (not shown) to function as a control point setting module 10*a*, a gamma curve generation module 10*b*, and a lookup table (LUT) update module 10*c*. The gamma correction unit 11 includes a gamma correction LUT 11*a*.

B. Operations of Projector

The projector PJ of this structure performs image projection operations as briefly described below. The A-D converter unit 12 inputs each analog image signal from any of diverse devices, such as TV sets, DVD players, and personal computers, converts the input analog image signal into a digital image signal, and outputs the digital image signal. The image processing unit 16 temporarily stores the image signal output from the A-D converter unit 12 in the frame memory 13. The image processing unit 16 reads the image signal temporarily stored in the frame memory 13, adjusts and regulates the contrast, the size, and other relevant conditions of the image to desired settings, and outputs the image signal with the adjusted and regulated settings to the gamma correction unit 11.

The gamma correction unit 11 refers to the gamma correction LUT 11*a* to make gamma correction of each input image signal and outputs the gamma-corrected image signal to the liquid crystal panel drive unit 14. According to a concrete procedure, the gamma correction unit 11 first converts R (red), G (green), and B (blue) signal components of the input image signal into Y (luminance), U (color difference between luminance and blue), and V (color difference between luminance and red) signals. The gamma correction LUT 11*a* stores an output tone value after gamma correction in relation to each input tone value of the Y (luminance) signal according to a gamma curve generated by the gamma curve generation module 10*b*. The gamma correction unit 11 refers to the gamma correction LUT 11*a* and converts the input tone value of the Y (luminance) signal among the Y, U, and V signals to make gamma correction of the Y (luminance signal) according to the generated gamma curve. The gamma correction unit 11 then inversely converts the gamma-corrected Y (luminance) signal and the other U and V signals into R, G, and B signals to obtain a gamma-corrected image signal.

The liquid crystal panel drive unit 14 drives the liquid crystal panel 21 in response to the input image signal. The liquid crystal panel 21 modulates illumination light emitted from the illumination optical system 20 according to image information. The projection optical system 22 then projects the illumination light modulated by the liquid crystal panel 21 on a screen (not shown). A projected image is accordingly displayed on the screen.

The projector PJ of this structure has the image processing unit 16 and the gamma correction unit 11 as separate elements. In one possible modification, the image processing unit and the gamma correction unit may be integrated to one structural element.

Such gamma correction of each input image signal enables a projected image displayed on the screen to have the substantially equal brightness to the brightness of an original image represented by the input image signal.

The projector PJ of FIG. 1 accepts the user's adjustment of the generated gamma curve for display of a projected image having the user's desired brightness property.

A concrete procedure of such adjustment provides multiple control points corresponding to multiple preset input tone values in an x-y coordinate plane with the input tone value of the Y (luminance) signal as an x-axis and the output tone value as a y-axis. When the user operates the remote control 30 to give an instruction to the CPU 10 via the remote control unit 15, the control point setting module 10*a* attained by the CPU 10 changes an output tone value at a selected control point among the multiple control points in response to the user's instruction and accordingly shifts the position of the selected control point to the user's desired position in the y-axis direction. The gamma curve generation module 10*b* then newly generates a gamma curve by joining all the control points including the shifted control point. The lookup table update module 10*c* updates the settings stored in the gamma correction LUT 11*a*, based on the newly generated gamma curve. The gamma correction unit 11 refers to the updated gamma correction LUT 11*a* to perform the gamma correction of the input image signal. This varies the brightness of the projected image displayed on the screen.

For the purpose of assisting the user's adjustment operations, a gamma curve adjustment window may open on a display (not shown) to show control points and a connecting gamma curve.

C. Gamma Curve Generation Process in First Embodiment

A gamma curve generation process is described below as a first embodiment of the invention.

Figure 2:
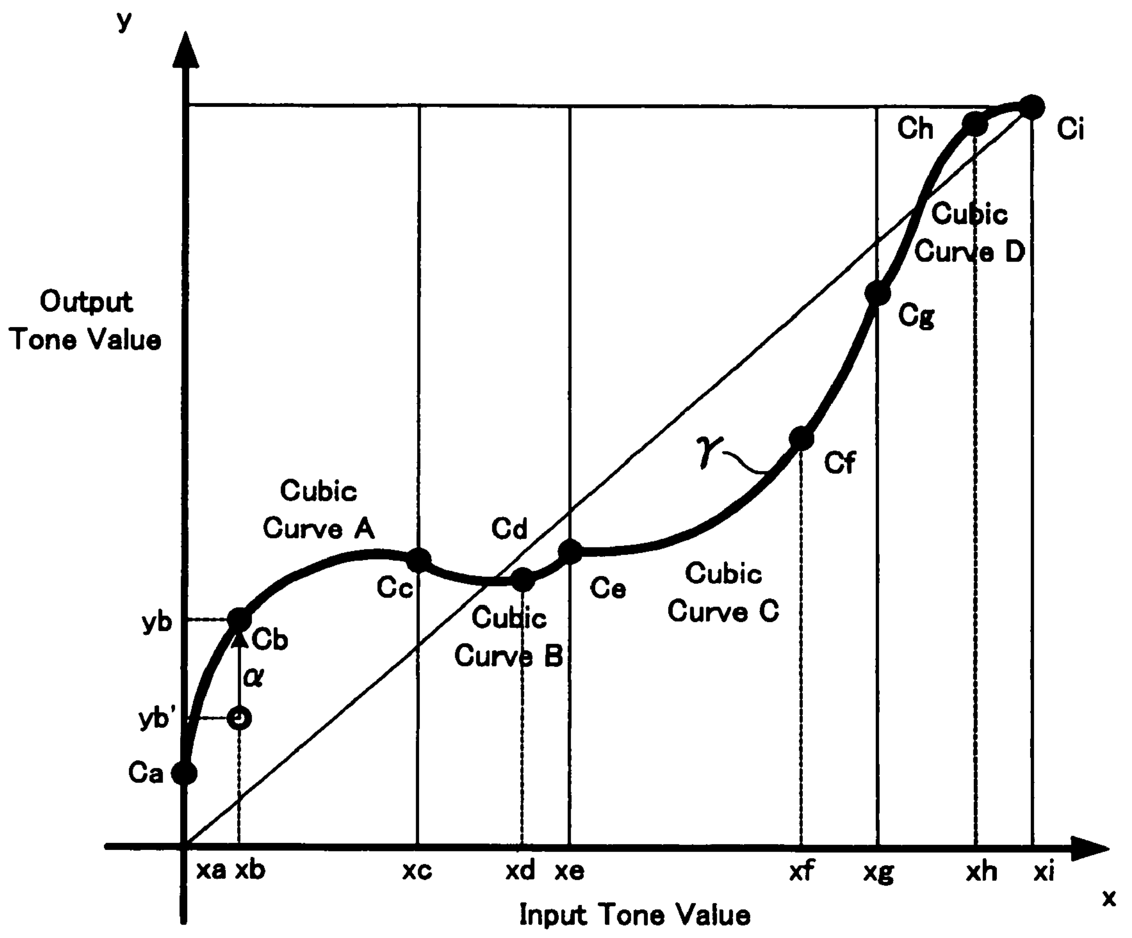
FIG. 2 shows a gamma curve generated by the gamma curve generation method of the invention.

FIG. 2 shows a gamma curve generated by the gamma curve generation method of the invention. In the graph of FIG. 2, the abscissa is the x-axis representing the input tone value of the Y (luminance) signal, and the ordinate is the y-axis representing the output tone value of the Y (luminance) signal.

In this illustrated example of FIG. 2, control points Ca through Ci are provided corresponding to preset 9 input tone values xa through xi. These control points are consecutive in an order of Ca, Cb, Cc to Ci. In response to the user's instruction through operations of the remote control 30, the control point setting module 10*a* changes an output tone value y at a selected control point among the nine control points Ca through Ci and accordingly shifts the position of the selected control point to the user's desired position in the y-axis direction. For example, when the user selects a control point Cb and changes its output tone value from yb' to yb, the position of the selected control point Cb is shifted to an illustrated position in the y-axis direction of an arrow α.

The gamma curve generation module 10*b* then newly generates a gamma curve γ by connecting the nine consecutive control points Ca through Ci including the shifted control point Cb.

The gamma curve generation method of this embodiment sequentially selects three consecutive control points among the nine control points Ca through Ci in an ascending order of corresponding input tone values and forms a cubic curve by connecting the three selected control points. The cubic curve is formed to pass through the three selected control points and have a tangent of a certain gradient at the middle control point, which is internal division at an inverse ratio of the gradients of two straight lines respectively connecting the middle control point with the two end points. Combining four cubic curves A through D formed from four sets of three consecutive control points completes the gamma curve γ. The concrete procedure of generating the gamma curve in this embodiment is described below in detail with reference to the flowchart of FIG. 3.

Figure 3:
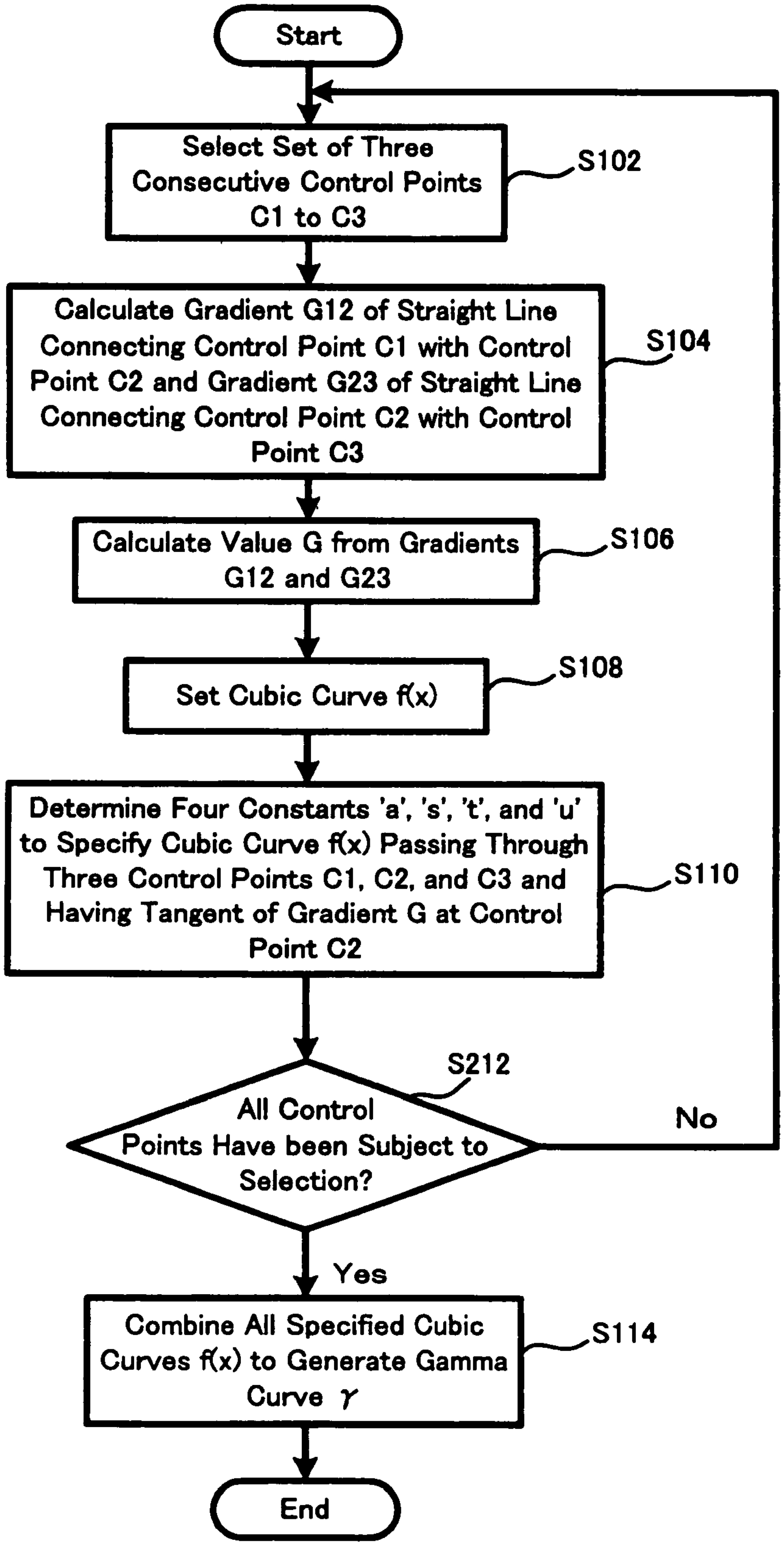
FIG. 3 is a flowchart showing a gamma curve generation process in a first embodiment of the invention.

The flowchart of FIG. 3 shows a gamma curve generation process in the first embodiment of the invention.

The gamma curve generation module 10*b* selects a first set of three consecutive control points C1, C2, and C3 among the nine control points Ca through Ci in the ascending order of corresponding input tone values (step S102). In the illustrated example of FIG. 2, the processing flow selects the control points Ca, Cb, and Cc as the first set of three consecutive control points C1, C2, and C3.

Figure 4:
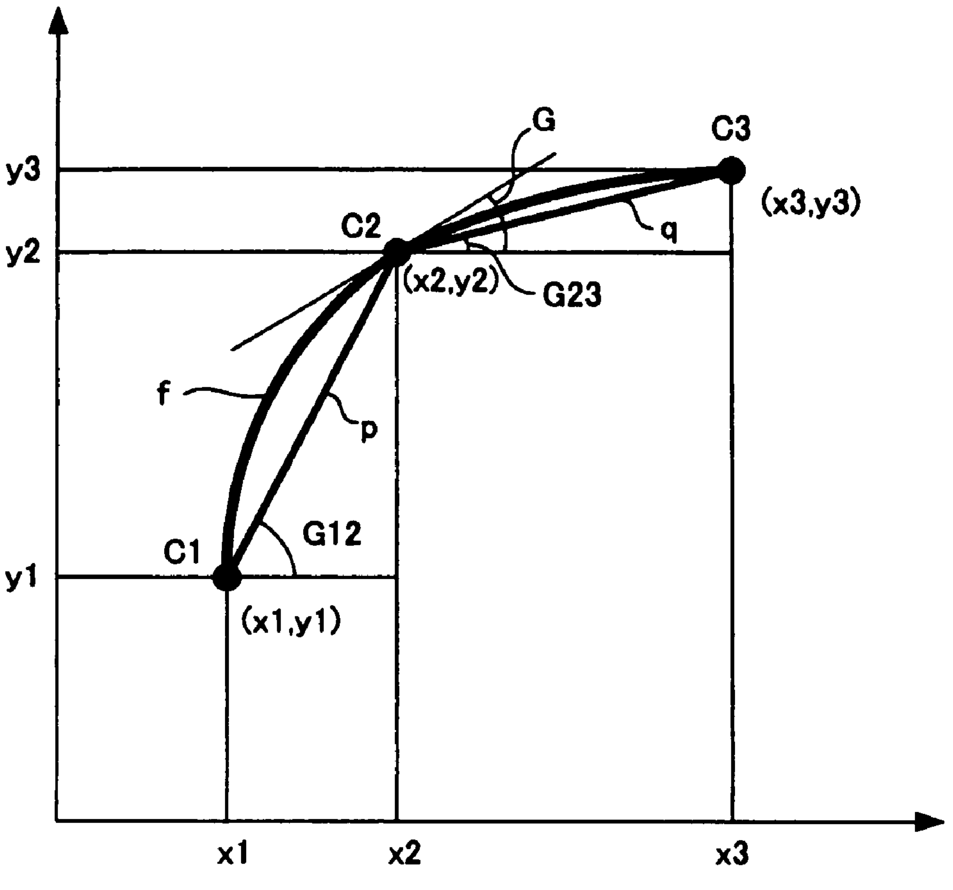
FIG. 4 shows three selected control points and a cubic curve f(x) formed by connecting the three selected control points in the gamma curve generation process of the first embodiment.

FIG. 4 shows three selected control points and a cubic curve f(x) formed by connecting the three selected control points in the gamma curve generation process of the first embodiment. In the example of FIG. 4, the three selected control points C1, C2, and C3 are respectively defined by coordinates (x1,y1), (x2,y2), and (x3,y3).

The gamma curve generation module 10*b* calculates a gradient G12 of a straight line 'p' connecting one end control point C1 with the middle control point C2 and a gradient G23 of a straight line 'q' connecting the middle control point C2 with the other end control point C3 according to Equations (3) given below (step S104):

$$G12 = \frac{y2 - y1}{x2 - x1} \qquad (3)$$

$$G23 = \frac{y3 - y2}{x3 - x2}$$

The gamma curve generation module 10*b* then calculates a value G from the gradients G12 and G13 according to Equation (4) given below (step S106):

$$\begin{aligned} G &= \frac{\frac{1}{|G12|} \times G12 + \frac{1}{|G23|} \times G23}{\frac{1}{|G12|} + \frac{1}{|G23|}} \\ &= \frac{|G12| \times G23 + |G23| \times G12}{|G12| + |G23|} \\ &= \frac{\left|\frac{y2 - y1}{x2 - x1}\right| \times \frac{y3 - y2}{x3 - x2} + \left|\frac{y3 - y2}{x3 - x2}\right| \times \frac{y2 - y1}{x2 - x1}}{\left|\frac{y2 - y1}{x2 - x1}\right| + \left|\frac{y3 - y2}{x3 - x2}\right|} \end{aligned} \qquad (4)$$

The gamma curve generation module 10*b* then sets a cubic curve f(x) as Equation (5) given below (step S108):

$$f(x)=a+s(x-x1)+t(x-x1)^2+u(x-x1)^3 \qquad (5)$$

where 'a', 's', 't', and 'u' denote constants.

The gamma curve generation module 10*b* determines the four constants 'a', 's', 't', and 'u' to specify the cubic curve f(x), which passes through the three selected control points C1, C2, and C3 and has a tangent of a gradient G at the middle control point C2 (step S110).

The cubic curve f(x) passing through the end control point C1 (x1,y1) satisfies Equation (6) given below:

$$f(x1)=y1=a \qquad (6)$$

The cubic curve f(x) further passing through the middle control point C2 (x2,y2) satisfies Equation (7) given below:

$$f(x2)=y2=a+s(x2-x1)+t(x2-x1)^2+u(x2-x1)^3 \qquad (7)$$

The cubic curve f(x) also passing through the end control point C3 (x3,y3) satisfies Equation (8) given below:

$$f(x3)=y3=a+s(x3-x1)+t(x3-x1)^2+u(x3-x1)^3 \quad (8)$$

The cubic curve f(x) having a tangent of the gradient G at the middle control point C2 or having the value G of first differential at the middle control point C2 satisfies Equation (9) given below:

$$f'(x2)=G=s+2t(x2-x1)+3u(x2-x1)^2 \quad (9)$$

Since the value G is calculated according to Equation (4) at step S106, solution of the four simultaneous equations (6) to (9) determines the four constants 'a', 's', 't', and 'u'.

The four determined constants 'a', 's', 't', and 'u' are respectively registered in four registers (not shown) by the gamma curve generation module 10*b*. The gamma curve generation module 10*b* subsequently uses the four constants 'a', 's', 't', and 'u' individually registered in the four registers to specify the cubic curve f(x).

The gamma curve generation module 10*b* then determines whether all the nine control points Ca through Ci have been selected for the above series of processing (step S112). When there is still any unselected control point among the nine control points C1 through Ci (step S112: No), the processing flow returns to step S102 to select a next set of three consecutive control points C1, C2, and C3. The processing flow selects the control points Cc, Cd, and Ce as the next set of three consecutive control points C1, C2, and C3 in the illustrated example of FIG. 2. The end control point Cc is selected in both the first set and the next set to ensure the continuity of adjacent cubic curves. The processing of steps S102 to S110 is repeated until completed selection of all the control points Ca through Ci.

On completion of selection with regard to all the control points Ca through Ci, the gamma curve generation module 10*b* combines the four specified cubic curves A to D to generate the gamma curve γ as shown in FIG. 2 (step S114) and terminates the series of processing shown in the flowchart of FIG. 3.

The lookup table update module 10*c* sequentially updates the settings stored in the gamma correction LUT 11*a* according to the generated gamma curve γ. The gamma correction unit 11 refers to the updated gamma correction LUT 11*a* and makes the gamma correction of the input image signal to change the brightness of the projected image according to the user's demand.

D. Effects of First Embodiment

As described above, the gamma curve generation process of the first embodiment forms one cubic curve by connecting one set of three consecutive control points. As in the illustrated example of FIG. 2, when there are nine control points used for generation of the gamma curve γ, the gamma curve generation process forms four cubic curves by respectively connecting four sets of three consecutive control points. Since each cubic curve has four constants to be determined, determination of the total 16 constants leads to specification of the four cubic curves. Sixteen registers are to be provided for storage of the 16 constants, which are used to specify the four cubic curves.

The gamma curve generation process of the first embodiment requires determination of only the 16 constants for generation of the gamma curve γ. This demands the less amount of computation and thus desirably shortens the processing time. The required number of registers is only 16 for storage of the 16 constants. This desirably reduces the required circuit scale.

E. Gamma Curve Generation Method in Second Embodiment

Another gamma curve generation process is described below as a second embodiment of the invention.

In the illustrated example of FIG. 2, the control points Ca through Ci are provided corresponding to the preset 9 input tone values xa through xi. In response to the user's instruction through operations of the remote control 30, the control point setting module 10*a* changes the output tone value y at a selected control point among the nine control points Ca through Ci and accordingly shifts the position of the selected control point to the user's desired position in the y-axis direction. The gamma curve generation module 10*b* then newly generates a gamma curve γ by connecting the nine consecutive control points Ca through Ci including the shifted control point Cb.

The gamma curve generation method of this embodiment sequentially selects three consecutive control points among the nine control points Ca through Ci in the ascending order of corresponding input tone values and forms a cubic curve by connecting the three selected control points. The cubic curve is formed to pass through the three selected control points and minimize the sum of a first area and a second area. The first area is defined by a straight line connecting one end control point with the middle control point and an arc of the cubic curve between the one end control point and the middle control point. The second area is defined by a straight line connecting the middle control point with the other end control point and an arc of the cubic curve between the middle control point and the other end control point. Combining four cubic curves A through D formed from four sets of three consecutive control points completes the gamma curve γ. The concrete procedure of generating the gamma curve in this embodiment is described below in detail with reference to the flowchart of FIG. 5.

Figure 5:
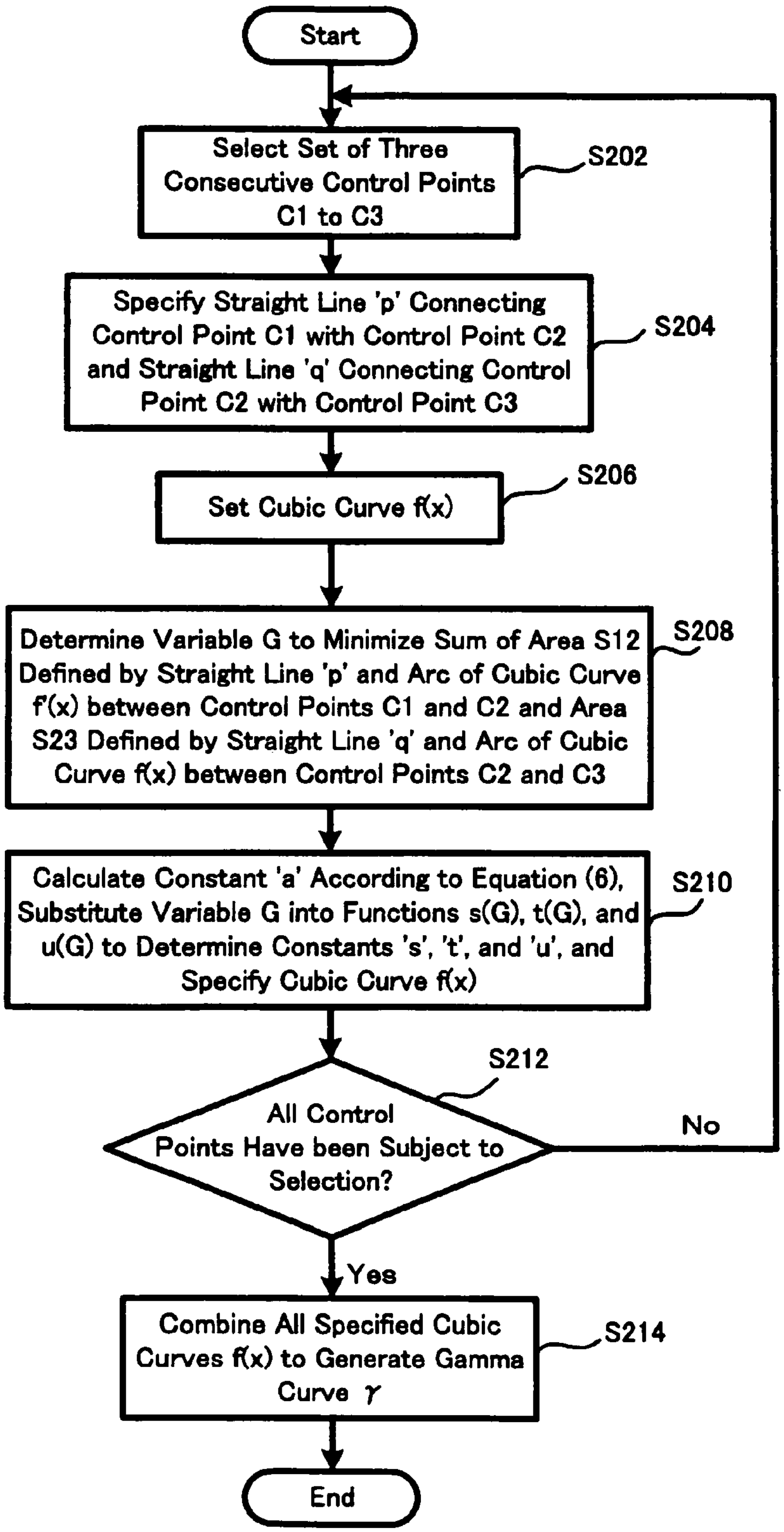
FIG. 5 is a flowchart showing a gamma curve generation process in a second embodiment of the invention.

The flowchart of FIG. 5 shows a gamma curve generation process in the second embodiment of the invention.

The gamma curve generation module 10*b* selects a first set of three consecutive control points C1, C2, and C3 among the nine control points Ca through Ci in the ascending order of corresponding input tone values (step S202).

Figure 6:
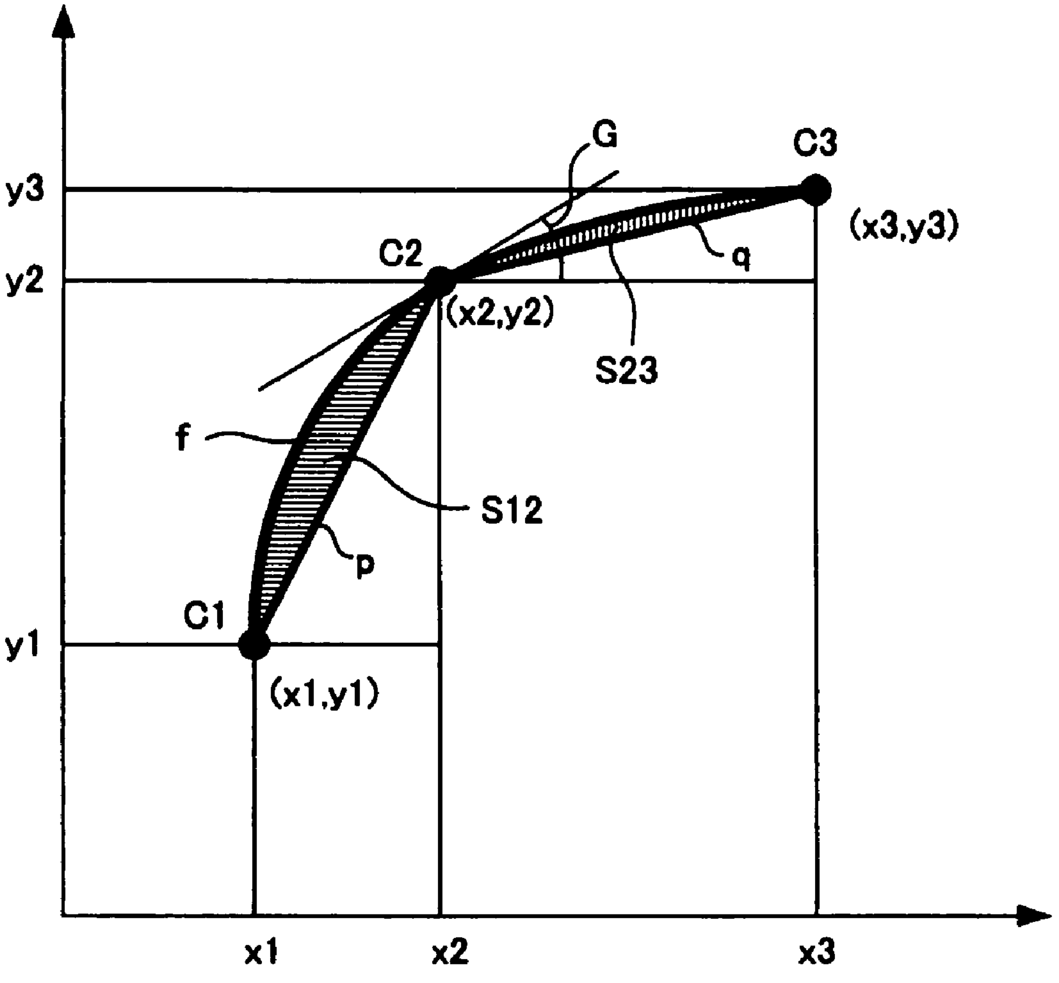
FIG. 6 shows three selected control points and a cubic curve f(x) formed by connecting the three selected control points in the gamma curve generation process of the second embodiment.

FIG. 6 shows three selected control points and a cubic curve f(x) formed by connecting the three selected control points in the gamma curve generation process of the second embodiment. In the example of FIG. 6, the three selected control points C1, C2, and C3 are respectively defined by coordinates (x1,y1), (x2,y2), and (x3,y3).

The gamma curve generation module 10*b* specifies a straight line 'p' connecting one end control point C1 with the middle control point C2 among the three selected control points C1, C2, and C3 according to Equation (10) given below and a straight line 'q' connecting the middle control point C2 with the other end control point C3 according to Equation (11) given below (step S204):

$$p(x) = \left(\frac{y2-y1}{x2-x1}\right)x + y1 - x1 \times \left(\frac{y2-y1}{x2-x1}\right) \quad (10)$$

$$q(x) = \left(\frac{y3-y2}{x3-x2}\right)x + y2 - x2 \times \left(\frac{y3-y2}{x3-x2}\right) \quad (11)$$

The gamma curve generation module 10*b* subsequently sets a cubic curve f(x) according to Equation (12) (step S206):

$$f(x)=a+s(G)x+t(G)x^2+u(G)x^3 \quad (12)$$

where ‘a’ denotes a constant and s(G), t(G), and u(G) represent functions of a variable G.

The gamma curve generation module 10*b* determines the variable G to minimize the sum of an area S12 and an area S23 (step S208). The area S12 is defined by the straight line ‘p’ and an arc of the cubic curve f(x) between the one end control point C1 and the middle control point C2. The area S23 is defined by the straight line ‘q’ and an arc of the cubic curve f(x) between the middle control point C2 and the other end control point C3.

The variable G is determined by solution of Equation (13) given below:

$$\frac{d\left(\int_{x1}^{x2}|f(x)-p(x)|dx+\int_{x2}^{x3}|f(x)-q(x)|dx\right)}{dG}=0 \tag{13}$$

The area S12 is given by integration of the absolute value of the difference between the cubic curve f(x) and the straight line ‘p’ from a value ‘x1’ to a value ‘x2’. The area S23 is given by integration of the absolute value of the difference between the cubic curve f(x) and the straight line ‘q’ from the value ‘x2’ to a value ‘x3’. The variable G is specified to make the first differential of the sum of the areas S12 and S23 with respect to the variable G equal to zero.

The gamma curve generation module 10*b* calculates the constant ‘a’ according to Equation (6) given above (a=y1), substitutes the variable G determined at step S208 into the functions s(G), t(G), and u(G) to determine the constants ‘s’, ‘t’, and ‘g’, and eventually specifies the cubic curve f(x) (step S210).

The four determined constants ‘a’, ‘s’, ‘t’, and ‘u’ are respectively registered in four registers (not shown) by the gamma curve generation module 10*b*. The gamma curve generation module 10*b* subsequently uses the four constants ‘a’, ‘s’, ‘t’, and ‘u’ individually registered in the four registers to specify the cubic curve f(x).

The gamma curve generation module 10*b* then determines whether all the nine control points Ca through Ci have been selected for the above series of processing (step S212). When there is still any unselected control point among the nine control points C1 through Ci (step S212: No), the processing flow returns to step S202 to select a next set of three consecutive control points C1, C2, and C3. The processing of steps S202 to S210 is repeated until completed selection of all the control points Ca through Ci.

On completion of selection with regard to all the control points Ca through Ci, the gamma curve generation module 10*b* combines the four specified cubic curves A to D to generate the gamma curve γ as shown in FIG. 2 (step S214) and terminates the series of processing shown in the flowchart of FIG. 5.

The lookup table update module 10*c* sequentially updates the settings stored in the gamma correction LUT 11*a* according to the generated gamma curve γ. The gamma correction unit 11 refers to the updated gamma correction LUT 11*a* and makes the gamma correction of the input image signal to change the brightness of the projected image according to the user’s demand.

The four constants ‘a’, ‘s’, ‘t’, and ‘u’ may be determined by solution of simultaneous equations, instead of the above calculation. In this modified process, the gamma curve generation module 10*b* determines the four constants ‘a’, ‘s’, ‘t’, and ‘u’ to specify the cubic curve f(x), which passes through the three selected control points C1, C2, and C3 and has a tangent of a gradient G at the middle control point C2. The cubic curve f(x) passing through the end control point C1 (x1,y1) satisfies Equation (6) given above. The cubic curve f(x) further passing through the middle control point C2 (x2, y2) satisfies Equation (7) given above. The cubic curve f(x) also passing through the end control point C3 (x3,y3) satisfies Equation (8) given above. The cubic curve f(x) having the tangent of the gradient G at the middle control point C2 or having the value G of first differential at the middle control point C2 satisfies Equation (9) given above. Since the value G is determined according to Equation (13) at step S208, solution of the four simultaneous equations (6) to (9) determines the four constants ‘a’, ‘s’, ‘t’, and ‘u’.

F. Effects of Second Embodiment

As described above, the gamma curve generation process of the second embodiment forms one cubic curve by connecting one set of three consecutive control points and thus exerts the similar effects to those of the gamma curve generation process of the first embodiment. The gamma curve generation process of the second embodiment forms each cubic curve to minimize the sum of the area defined by the straight line and the arc of the cubic curve between one end control point and the middle control point and the area defined by the straight line and the arc of the cubic curve between the middle control point and the other end control point. The formed cubic curve is appropriate to a polygonal line passing through the three control points.

G. Modifications

The embodiments discussed above are to be considered in all aspects as illustrative and not restrictive. There may be many modifications, changes, and alterations without departing from the scope or spirit of the main characteristics of the present invention.

In the embodiments discussed above, the gamma curve generation method uses 9 control points for generation of a gamma curve. The number of control points is, however, not restricted to 9 but may be set arbitrarily according to the requirements.

In the embodiments discussed above, the Y (luminance) signal is the target of gamma correction. The technique of the invention is, however, not restricted to the Y signal but may be applied to process another image signal, for example, R signal, G signal, or B signal.

The above embodiments regard application of the invention to the projector. The technique of the invention is, however, not restricted to such projectors, but may be applicable to other image display devices such as liquid crystal displays, image printing devices such as printers, and image processing devices such as computer.

Finally the present application claims the priority based on Japanese Patent Application No. 2005-257472 filed on Sep. 6, 2005, which is herein incorporated by reference.

What is claimed is:

1. A gamma curve generation method of generating a curve passing through multiple consecutive control points as a gamma curve used for gamma correction of an image signal, the gamma curve generation method comprising the steps of:

(a) selecting each set of three consecutive control points among the multiple consecutive control points;

(b) forming a cubic curve passing through the selected three consecutive control points; and (c) combining all cubic curves formed in the step (b) to generate the gamma curve, the step (b) setting the selected three consecutive control points to a first control point, a second control point, and a third control point in a sequential order and specifying the cubic curve that passes through the first control point, the second control point, and the third control point and has a tangent of a gradient G at the second control point, which satisfies Equation (1) given below:

$$G = \frac{|G12| \times G23 + |G23| \times G12}{|G12| + |G23|} \tag{1}$$

where G12 denotes a gradient of a straight line connecting the first control point with the second control point and G23 denotes a gradient of a straight line connecting the second control point with the third control point, wherein the above steps are performed by a processor.

2. A gamma curve generation method of generating a curve passing through multiple consecutive control points as a gamma curve used for gamma correction of an image signal, the gamma curve generation method comprising the steps of:

(a) selecting each set of three consecutive control points among the multiple consecutive control points;

(b) forming a cubic curve passing through the selected three consecutive control points; and (c) combining all cubic curves formed in the step (b) to generate the gamma curve, the step (b) setting the selected three consecutive control points to a first control point, a second control point, and a third control point in a sequential order and specifying the cubic curve of passing through the first control point, the second control point, and the third control point to minimize a sum of an area defined by a straight line and an arc of the cubic curve between the first control point and the second control point and an area defined by a straight line and an arc of the cubic curve between the second control point and the third control point, wherein the above steps are performed by a processor.

3. A gamma curve generation device that generates a curve passing through multiple consecutive control points as a gamma curve used for gamma correction of an image signal, the gamma curve generation device selecting each set of three consecutive control points among the multiple consecutive control points, forming a cubic curve passing through the selected three consecutive control points, and combining all formed cubic curves to generate the gamma curve, the gamma curve generation device setting the selected three consecutive control points to a first control point, a second control point, and a third control point in a sequential order and specifying the cubic curve that passes through the first control point, the second control point, and the third control point and has a tangent of a gradient G at the second control point, which satisfies Equation (1) given below:

$$G = \frac{|G12| \times G23 + |G23| \times G12}{|G12| + |G23|} \tag{1}$$

where G12 denotes a gradient of a straight line connecting the first control point with the second control point and G23 denotes a gradient of a straight line connecting the second control point with the third control point.

4. A gamma curve generation device that generates a curve passing through multiple consecutive control points as a gamma curve used for gamma correction of an image signal, the gamma curve generation device selecting each set of three consecutive control points among the multiple consecutive control points, forming a cubic curve passing through the selected three consecutive control points, and combining all formed cubic curves to generate the gamma curve, the gamma curve generation device setting the selected three consecutive control points to a first control point, a second control point, and a third control point in a sequential order and specifying the cubic curve that passes through the first control point, the second control point, and the third control point to minimize a sum of an area defined by a straight line and an arc of the cubic curve between the first control point and the second control point and an area defined by a straight line and an arc of the cubic curve between the second control point and the third control point.

* * * * *